3,822,337
PROCESS FOR ELIMINATION OF AMMONIA AND HYDROGEN SULFIDE FROM GASES GENERATED IN COKE PLANTS AND GAS WORKS
Gunter Wunderlich, Sterkrader Str. 37, Bottrop, Germany; and Heinrich Weber, Lenaustr. 2; Gustav Choulat, Paulusstr. 63; and Dieter Laufhutte, Clausiusstr. 3, all of Recklinghausen, Germany
Continuation-in-part of abandoned application Ser. No. 38,253, May 18, 1970. This application Jan. 24, 1972, Ser. No. 220,246
Claims priority, application Germany, May 24, 1969, P 19 26 629.6
Int. Cl. B01d 53/34; C01b 2/04, 17/04
U.S. Cl. 423—224    11 Claims

ABSTRACT OF THE DISCLOSURE

The process of the invention relates to a multistage process for completely eliminating ammonia and hydrogen sulfide from coke oven gases, their condensates, desorption gases or damp vapors. This is accomplished by the combustion of ammonia so as to form nitrogen and water, and the combustion of hydrogen sulfide to form elementary sulfur in a novel multistage process in which the air, necessary for sustaining the combustion, is added to the above gases and vapors in several, preferably two, combustion stages and the gases from the combustion stages are likewise cooled in at least two stages, with at least one cooling stage following the first combustion stage, and at least a second cooling stage following the second combustion stage. High pressure steam is obtained as a by-product from the process. The decomposition of $NH_3$ in this process is complete, leading to generation of nitrogen and water, which are worked up separately, while $H_2S$ and $SO_2$ the latter formed during the process, are used for the recovery of elementary sulfur.

REFERENCE TO RELATED APPLICATIONS

This application is a continuation-in-part of our Copending Application now abandoned Ser. No. 38,253, filed May 18, 1970 for "Method for Processing of Gases Containing Ammonia and Hydrogen Sulfide Generated in Coke Plants and Gas Works."

SUMMARY OF THE INVENTION

The present invention relates to an improvement in the processing of gases or clouds of damp vapor containing ammonia and hydrogen sulfide generated in coke plants and gas works. This improvement results in complete elimination of $NH_3$ and $H_2S$ from the coke plant and gas work gases and vapors.

BACKGROUND AND PRIOR ART

A number of methods are known in which the ammonia contained in such gases or vapors is decomposed or burned. In one of the known processes, excess air is used and ammonia is burned giving nitrogen and water, whereas hydrogen sulfide is converted to sulfur dioxide. Subsequently, the sulfur dioxide is worked up to sulfuric acid by known methods.

Another known process involves complete removal of free ammonia contained in coke oven gases, which are scrubbed with water, and wherein ammonia has been concentrated in an operation which includes circulating ammonia and rinsing it free of hydrogen sulfide, the resulting de-acidified vapors which contain the concentrated ammonia being then burned, whereby nitrogen and water are produced. The process combines the following steps: (a) de-acidified vapors are burned completely, (b) the combustion heat of ammonia is recovered in the form of highly superheated steam, (c) the condensate is withdrawn, and (d) sulfuric acid is obtained from the combustion gases. However, in contrast with the multistage combustion process of the present invention, when the process is carried out with insufficient air in a single stage, the ammonia will be only partially burned to yield nitrogen and water, and partly decomposed to yield nitrogen and hydrogen. In that case, the hydrogen sulfide remains partly unchanged or, depending on the extent of insufficient air, it is converted completely or partly to elementary sulfur and further processed accordingly.

Another known method for decomposing ammonia contained in the gases of coke plants and gas works comprises heating by the combustion of a suitable medium, the vapors generated by the expulsion of gas-scrubbing waters or of condensates, wtih or without preceding de-acidification, and then passing said vapors through an empty decomposition zone or through columns filled with temperature resistant bodies or with a nickel catalyst in any desired shape.

For carrying out the process with indirect heating of the ammonia vapors an apparatus is known comprising a cylindrical refractory furnace which is insulated from the outside and provided with heating ducts and decomposition chambers, alternately arranged in concentric manner on a single radius or on several radii; also comprising a combustion chamber for the heating gas and a distribution space for the ammonia vapors.

Another known process removes the entire ammonia and hydrogen sulfide contained in coke oven gases by scrubbing with water and circulating ammonia water solution, enriching the ammonia and hydrogen sulfide content of the gases in vapors and burning the ammonia and hydrogen sulfide content of the vapors, using a sufficient amount of air for the combustion of ammonia to nitrogen and water and for that of hydrogen sulfide to yield sulfur. In this prior art process, the combustion heat of ammonia is recovered in the form of high-pressure steam and the sulfur contained in the gases is recovered as elementary sulfur. In carrying out the known process, it was found that very high temperatures, about 1400° to 1500° C., and very long periods of stay, about 1 to 2 minutes, are necessary to arrive at a complete decomposition of the $NH_3$. HCN gases, also contained in raw coke oven, are not yet totally decomposed to $H_2O$, CO and $N_2$ under these conditions. The small content of HCN will be washed out from the gases together wtih $H_2S$, but by the single stage combustion according to the conditions of the prior art process, the dangerous and harmful NO is formed. Such harmful gas should not be released into the open air since oxides of nitrogen are a dangerous source of air pollution. Moreover, according to this prior art process, clogging will occur in the waste heat vessels, the pipelines and the reactors, caused by formation of ammonium sulfate and ammonium sulfite, and the resulting sulfur as well as the waste waters will be contaminated by the mentioned salts. There will also occur fluctuations in the operations, for instance, the composition of the gases and vapors will vary and this is considered a serious drawback of the known prior art process. The multistage combustion process with multistage cooling has been found to solve these problems.

OBJECTS OF THE INVENTION

It is an object of the present invention to overcome the shortcomings of the known prior art methods of eliminating ammonia and hydrogen sulfide from coke plant gases and gas works gases.

It is a particular object of the process according to the invention to provide an improved process by which (a) ammonia contained in coke oven gases and in the scrubbing waters and condensates and enriched in desorption gases or in vapors, as well as (b) hydrogen sulfide and hydrogen cyanide likewise contained in the gases and vapors, are completely eliminated by multistage combustion with addition of a sufficient amount of air, in at least two stages, yielding gaseous products comprising (i) on the one hand, nitrogen and water, and (ii) on the other hand, elementary sulfur, and by cooling those gaseous products in at least two stages, while high-pressure steam is produced at the same time.

Other objects and advantages of the process according to the invention will be apparent to those skilled in the art from the detailed description herein.

DESCRIPTION OF THE PROCESS OF THE INVENTION

The novel process of this invention consists of the addition of combustion air to coke plant gases and vapors containing $NH_3$, $H_2S$ and $HCN$ in a plurality of stages, preferably in two stages. Depending on the composition of the gases or vapors and their contents in $NH_3$, $H_2S$ and $H_2O$, in some cases the totaal combustion heat of ammonia, and the partial combustion heat of $H_2S$ will be sufficient to maintain the entire process in operation. In case the vapors are too much diluted by steam, it is advisable to add combustible or fuel gases, particularly coke oven gas, as ignition or combustion agents for sustaining the process. However, it should be borne in mind that the aforesaid gases or vapors containing $NH_3$, $H_2S$ and $HCN$ also have a certain content in benzene, naphthalene, and tar, and thus, these gases have a tendency to form soot during the process when the content in steam present in the gas and generated by combustion of $NH_3$ is low. In order to avoid soot formation and unbalancing of the equilibrium by formation of carbon monoxide, in that case, it is advisable to add steam, which, at the same time will often make admixture of ignition gases or combustible gases necessary. In carrying out the process of the invention, it has been discovered that it is critical *in a first stage* to add the amount of air necessary for the combustion of the combustible or fuel gases and heat up the gas mixture by the complete combustion of said gases to the decomposition temperature of $NH_3$ and $HCN$. Then these two gases are decomposed in the presence of a catalyst to yield $N_2$, $H_2$ and $CO$. It has also been discovered that it is critical to add to the gas mixture, which is now free of $NH_3$ and $HCN$, just so much air *in a second stage* that a partial combustion of the hyrogen generated by the decomposition of $NH_3$ and $HCN$, and of part of the $H_2S$ takes place. In this manner, it has been found that a gas mixture is obtained which has the critical ration $H_2S:SO_2=2:1$ which has been discovered to be essential for processing these two gases in a "Claus Oven" as described in McGraw-Hill's "Encyclopedia of Science and Technology," 1960, volume 13, page 255, so as to obtain elementary sulfur.

The remarkable and surprising improvement brought about by the novel process discovered according to the present invention comprises addition of the combustion air in stages, thus enabling critical conditions of the entire process to be controlled more easily. If, for instance, the admission of fuel gas is dispensed with, the process is conducted in such a manner that in the first stage the complete decomposition of $NH_3$ and $HCN$ is effected in the presence of the catalyst, whereas the second stage only concerns the proper adjustment of the amount of air to yield the gases in the proportion for use in the Claus process. According to the invention, the temperature in the first stage where the catalyst is present, ranges from about 1050° to 1250° C., and the period of stay from about 0.2 to about 1.0 secs.

Compared therewith, the temperatures obtained in the prior art processes are above 1400° C., as mentioned before, and the periods of stay from 1–2 minutes. These prior art conditions result in less efficiency since they involve the use of very large apparatus, and greater expenditure of heat and greater time of operation. In view of these factors, the improvements attendant to the novel process of the invention are quite considerable and remarkable.

Prior art processes resulted in gases produced of 1700° or more and these high temperatures reduce efficiency requiring extraordinary equipment to prevent failure: e.g., construction of combustion furnaces and waste heat boilers of special material, such as zirconium oxide. These disadvantages are avoided in the present process wherein the highest temperatures of gaseous products from the combustion stage are about 1350° C.

In the a preferred embodiment according to the invention, the dissipation of the combustion heat, that is to say, the cooling of the partly burned mixtures, is likewise effected in several, e.g., two, stages. Furthermore, the various features of novelty which characterize the invention are pointed out with particularity in the claims annexed to and forming a part of this specification. For a better understanding of the invention, its operating advantages and specific objects attained by its uses, reference is made to the accompanying drawings and descrpition matter in which there are illustrated specific and preferred embodiments of the invention. In the accompanying drawings as hereinafter described, the process of the invention is more fully illustrated by way of examples.

DESCRIPTION OF SPECIFIC EMBODIMENTS

Figure 1:
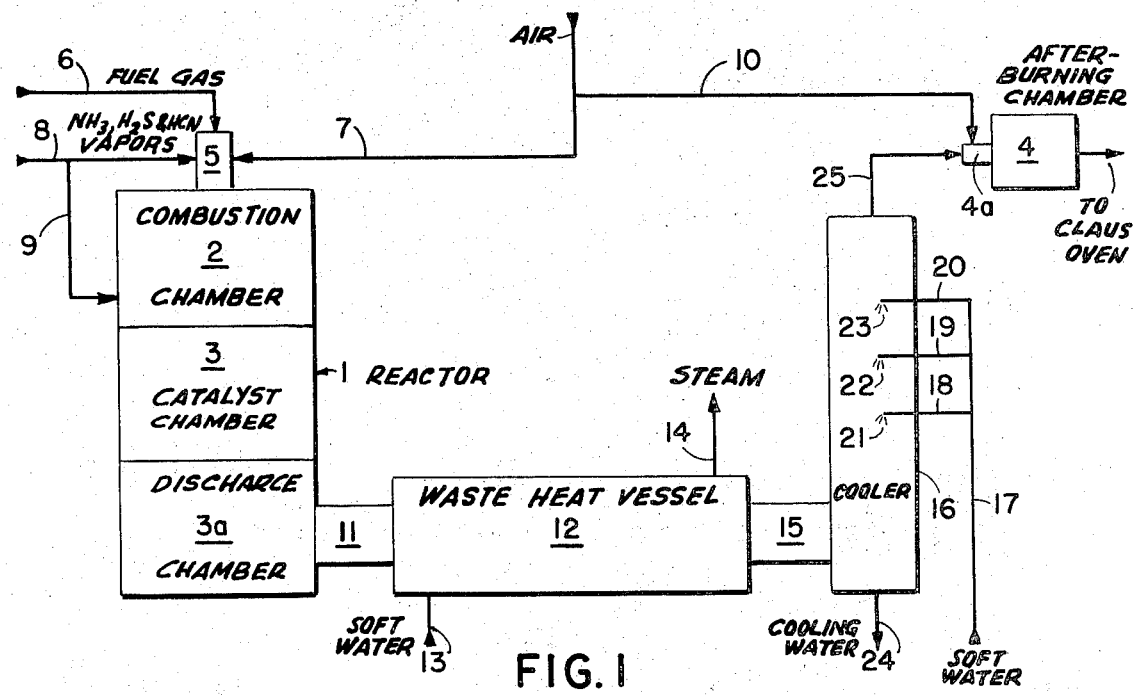
FIG. 1 is a schematic diagram of a plant for carrying out the process according to one embodiment of the invention.

Referring first to FIG. 1, a reactor 1 is shown which comprises several compartments; a combination chamber 2, a catalyst chamber 3, and a discharge chamber 3a. A burner 5 is provided with a pipeline 6 for admission of fuel gas and a line 7 through which air is introduced. Damp vapors containing $NH_3$, $H_2S$ and $HCN$ are fed to the burner 5 through line 8 and to combustion chamber 2 through line 9. In chamber 2, the damp vapors are burned to the extent in which combusiton air is present, that is to say, fuel gas is completely burned, $NH_3$ and $HCN$ may be partly burned and $H_2S$ may also be partly burned yielding elementary sulfur and $SO_2$.

The partly burned gases pass into the catalyst chamber 3 which is filled with a nickel catalyst on magnesite or alumina as carrier. There, remaining ammonia is decomposed to nitrogen and hydrogen, HCN forms hydrogen, nitrogen, and carbon monoxide. The decomposed gases pass into discharge chamber 3a and from there through a short circuit 11 into a waste heat vessel 12 to which soft water is admitted by line 13 and from which steam is withdrawn by line 14. Cooled decomposition gases pass through a short conduit 15 into a direct cooler 16; in the upper part of the cooler a spraying device is arranged consisting of pipes 18–20 and spray-discharge members 21–23. Soft water is fed to the cooler 16 by a pipeline 17, and cooling water is withdrawn by a pipeline 24 and passed on to further processing. The cooled gases escape through a pipe 25 to an after-burning chamber 4 with burner 4a. Air is fed to burner 4a through pipeline 10; in the chamber 4, $H_2S$ is burned to an extent that, in the final gas, the ratio of $H_2S:SO_2=2:1$ is obtained. That gas is fed into a Claus oven and worked up to elementary sulfur, while the remaining gases are blown into the open air.

Example I

Referring to FIG. 1 of the drawings, vapor from coking gas purification of the composition, quantity and temperature as stated under I in the following Table 1 are introduced through conduit 8 into the burner 5 of the reactor 1 divided into the combustion chamber 2, the catalyst zone 3 and the exhaust zone 3a. In this example, a division of the vapor quantity and introduction of a part through conduit 9 directly into the combustion chamber 2 is dispensed with. Also, the addition of combustion gas through conduit 6 into the burner 5 is dispensed with. Through conduit 7, 990 Nm.³/h. combustion air at 18° C. are introduced into the burner 5 and the vapors partially burned. The composition, quantity and temperature of the gas mixture forming in the combustion chamber 2 are stated in Table 1 under II. The gas mixture traverses the catalyst zone 3, which is filled with a nickel catalyst on magnesite as a carrier. Alternatively, a nickel on alumina carrier is used. Here, residual ammonia and hydrogen cyanide are decomposed into nitrogen, hydrogen and carbon monoxide. Hydrogen cyanide is decomposed or burned in large part already before and is present only in traces. The decomposition gases pass into the exhaust zone 3a. Their composition, quantity and temperature are stated under III in Table 1. They pass through the pipe connection 11 into the waste heat boiler 12, which is supplied with soft water through conduit 13. From line 14 are taken 1000 kg./hr. of steam at 15 atmos. In the waste heat boiler 12, the gases are cooled. The characteristics of the gases are shown in Table 1 under IV. These gases leave the waste heat boiler 12 through the pipe connection 15 and enter the direct cooler 16, in which they are cooled with 20 m.³ of water at 30° C. The cooling water is brought up and into the cooler 16 through the conduits 17 to 20 and distributed through the devices 21 to 23. 20,530 m.³/hr. of cooling water heated to 55° C. leave the cooler 16 again through conduit 24. The cooled gas leaves the cooler 16 through conduit 25. The characteristics of this gas are listed in Table 1 under V. This gas enters the after-combustion zone 4 through the burner 4a and is there burned with 650 Nm.³ of combustion air at 18° C. from the conduits 7 and 10 so that in the final gas, which leaves the afer-combustion zone 4 through the conduit to the Claus Oven, a $H_2S/SO_2$ ratio of 2:1 prevails. The characteristics of their gas are given in Table 1 under VI. As described, this gas is supplied to a Claus unit and processed to sulfur.

The highest temperature occurring in the unit in this example is 1150° C. When (alternatively, at another point before the waste heat boiler 12) one adds the 650 Nm.³ of after-combustion air to the burner 5 through line 7 without the intermediate cooling according to the invention having taken place, the gas temperature rises to 1715° C. and the reactor 1 and the waste heat boiler 12 or respectively parts thereof must be made of special refractory materials.

The decomposed gases pass through short pipe 111 to the waste heat vessel 112 which receives soft water from pipeline 113 and from which steam is withdrawn through pipeline 114. From vessel 112, a part of the cooled gases reaches an indirect cooler 38 through line 115, whereas another part passes through pipeline 31 to a Claus oven (not shown) for the recovery of sulfur from the $H_2S$ and $SO_2$ contents of the gases. The remaining gases are blown into the open air.

The portion of the decomposition gases entering indirect cooler 38 is cooled by a series of cooling tubes 32. The cooling system is supplied with soft water through pipeline 33 and vapor is withdrawn through line 30. Cooled gases are recycled by way of line 35, blower 36, line 37 to line 129, and they serve for reducing the temperature of the decomposition gases in the discharge chamber 103a.

The cooler 38 is equipped with a slanting bottom 39 where liquid sulfur obtained during the cooling step can be collected and separated from the cooling water leaving the device through discharge line 40.

Example II

Figure 2:
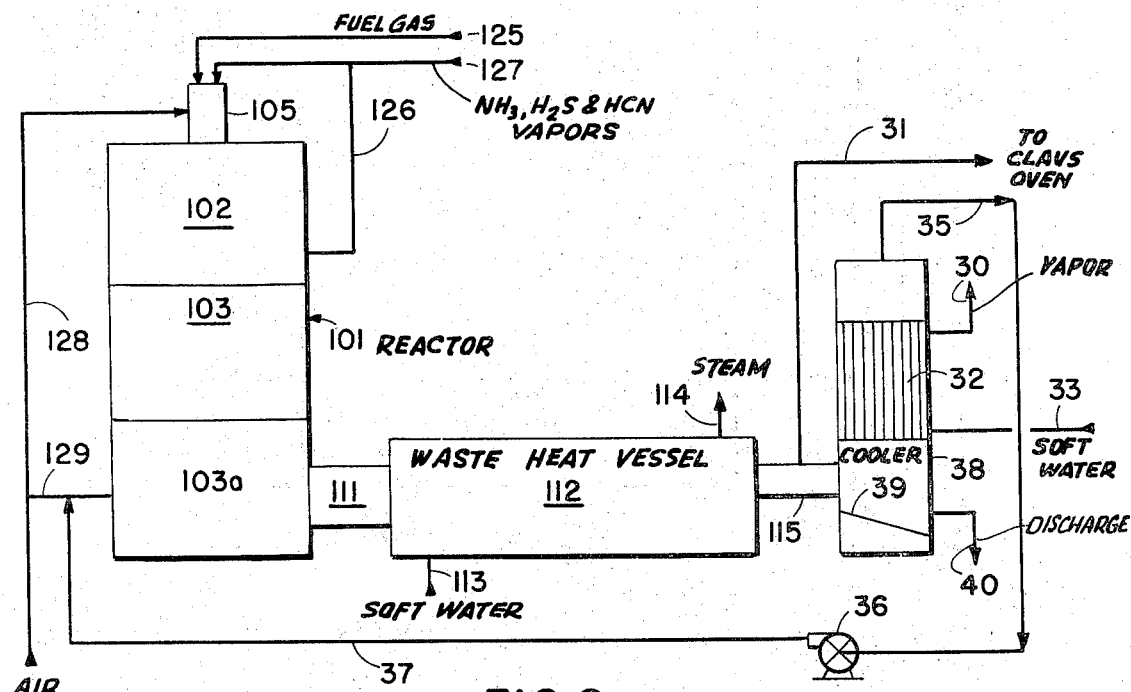
FIG. 2 is a schematic diagram of another embodiment of a plant for carrying out the process of the invention.

Referring to FIG. 2 of the drawings, the burner receives through line 127 the vapors as defined under I in the following Table 2. In this example II, no use is made of the possibility of adding combustion gases through line 125. Also, the by-pass line 126 for the burner 5 is not used in this example. In another embodiment, line 126 is used to introduce a part of the vapors directly into the combustion chamber 102 when needed. Through the conduit 128, 990 Nm.³/hr. of air at 18° C. are injected into the burner 105 and therewith the vapors are partially burned. Under II in Table 2 are given the characteristics of the gas mixture forming in combustion chamber 102. The gas mixture now traverses the catalyst zone 103, in which residual ammonia and traces of hydrogen cyanide are decomposed. The characteristics of the decomposition gas are compiled under III in Table 2. Through the conduit 129, 650 Nm.³/hr. of air are introduced into the exhaust zone 103a and, in addition, through line 37, cycle gas from the condenser 38, the characteristics of which are given under IV in Table 2. The characteristics of the gas at the exit of the exhaust zone 103a are compiled in Table 2 under V. In the waste heat boiler 112, 1100 kg./hr. of steam at 15 atmos. are produced.

Through the connection pipe 115 and line 31 a gas mixture issues which is suitable for processing in a Claus unit. The characteristics of this gas mixture are indicated in Table 2 under VI. The circulating gas enters the indirect cooler 38 unit. The latter receives soft water through conduit 33, and through conduit 30, 100 kg./hr. of steam at 1.5 atmospheres are taken from this unit.

TABLE 1

| Number | Substance | I | II | III | IV | V | VI |
|---|---|---|---|---|---|---|---|
| 1 | $NH_3$, volume percent | 39 | 4.6 | | | | |
| 2 | $N_2$, volume percent | | 45.5 | 45.6 | 45.6 | 66.40 | 73.0 |
| 3 | HCN, volume percent | 2 | | | | | |
| 4 | $H_2O$, volume percent | 30 | 36.3 | 34.8 | 34.8 | 5.15 | 13.4 |
| 5 | $CO_2$, volume percent | 15 | 7.0 | 6.7 | 6.7 | 9.75 | 7.0 |
| 6 | $H_2S$, volume percent | 14 | 6.6 | 6.4 | 6.4 | 9.20 | 4.4 |
| 7 | $SO_2$, volume percent | | | | | | 2.2 |
| 8 | $H_2$, volume percent | | | 6.5 | 6.5 | 9.50 | |
| 9 | Nm.³/hour | 950 | 2,025 | 2,117 | 2,117 | 1,455 | 2,040 |
| 10 | ° C | 70 | 1,150 | 1,100 | 300 | 35 | 800 |

FIG. 2 shows a similar arrangement of a reactor 101 comprising three compartments 102, 103 and 103a; the burner is designated by 105. Fuel gas is fed to the burner through a pipeline 125 and the $NH_3$— and $H_2S$— and HCN— containing gases or vapors through a pipeline 127. Part of the vapors may be fed directly to chamber 102 by pipeline 126. Combustion air is admitted in two stages, in one instance through line 128 to burner 105, in the other instance through a branchline 129 to discharge chamber 103a. So much air is introduced into chamber 103a that the ratio of $H_2S:SO_2 = 2:1$ will be obtained.

The cooled gas is cycled back via lines 35, blower 36 and lines 37 and 129 into the exhaust zone 103a before the waste heat boiler 112. The inclined bottom 39 in cooler 38 serves for the collection of small quantities of liquid sulfur, which are drawn off through line 40.

The highest temperature occurring in the process in this Example II is 1350° C. Without the circulation of cooled gas according to the invention, the temperature rises to 1757° C. in the exhaust zone 103a. At this high temperature, parts of the waste heat boiler must then be made of expensive high grade refractory materials.

TABLE 2

| Number | Substance—Quantity—Temperature | I | II | III | IV | V | VI |
|---|---|---|---|---|---|---|---|
| 1 | $NH_3$, volume percent | 39 | 4.6 | | | | |
| 2 | $N_2$, volume percent | | 45.5 | 45.6 | 54.4 | 54.4 | 54.4 |
| 3 | HCN, volume percent | 2 | | | | | |
| 4 | $H_2O$, volume percent | 30 | 36.3 | 34.8 | 34.6 | 34.6 | 34.6 |
| 5 | $CO_2$, volume percent | 15 | 7.0 | 6.7 | 5.9 | 5.9 | 5.9 |
| 6 | $H_2S$, volume percent | 14 | 6.6 | 6.4 | 3.4 | 3.4 | 3.4 |
| 7 | $SO_2$, volume percent | | | | 1.7 | 1.7 | 1.7 |
| 8 | $H_2$, volume percent | | | 6.5 | | | |
| 9 | Nm.³/hour | 950 | 2,025 | 2,117 | 900 | 3,600 | 2,700 |
| 10 | °C | 70 | 1,150 | 1,100 | 130 | 1,350 | 300 |

Figure 3:
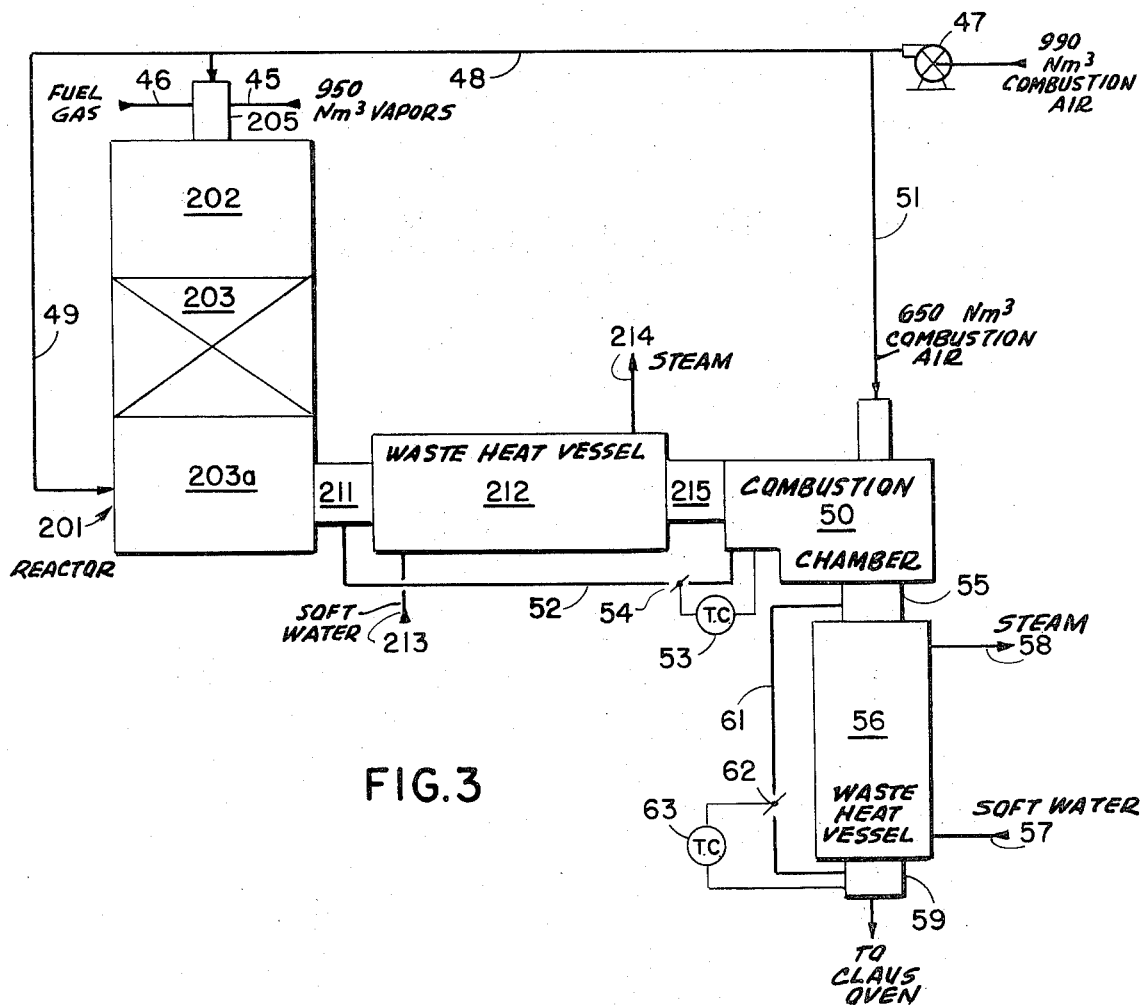
FIG. 3 is yet another schematic daigram illustrating an embodiment of a plant for carrying out the process of the invention.

FIG. 3 illustrates another embodiment of the device and it will now be described together with illustrative examples for carrying out the process of the invention. The reactor 201 again comprises three compartments 202, 203 and 203a, in analogy to the device shown in FIGS. 1 and 2. A burner 205 receives damp vapors through pipeline 45, e.g., 950 Nm.³ damp vapors per hour whose composition is shown in the following Table 3 under I. The vapors have a temperature of 70° C. and are under a pressure of 1.15 atmosphere (absolute). 990 Nm.³ combustion air are admixed with the vapors by means of a blower 47 and through line 48 and the mixture is partly burned in the burner 205 and passed into combustion chamber 202. The partly burned decomposition gas has a volume of 2,025 Nm.³ and a temperature of 1150° C. when it enters the catalyst chamber 203 where metallic nickel is deposited on magnesite rings. The composition of the gas is indicated under II in Table 3. It is shown that at this stage, already three-quarters of $NH_3$ have been decomposed, while HCN is completely decomposed except for traces; $H_2S$ has not yet been burned to $SO_2$. The period of stay in the catalyst chamber 203 amounts to 0.2 sec.

While the gas passes through catalyst chamber 203, the remainder of $NH_3$ is split under consumption of heat into $N_2$ and $H_2$ and the gas leaves the catalyst chamber at a temperature of 1110° C. The remaining amount of HCN is now likewise being split. Through line 49, additional combustion air can be admitted to discharge chamber 203a. In the present example, however, no use is made of this possibility. Also, there is made no use of the possibility of the admittance of fuel gas to the burner 205 by line 46. The gases pass through the short pipe 211 to waste heat vessel 212, where 400 kg. steam of 15 atmos. excess pressure are generated per hour. Lines 213 and 214 serve the purpose already described. The decomposition gas, now cooled down to 800° C., passes through short pipe 215 to a second combustion chamber 50, into which 650 Nm.³ combustion air are hourly introduced through line 51. The gas temperature before it enters chamber 50 is maintained at a constant 800° C. by means of a by-pass 52, regulating flap 54 and a temperature control element 53.

In combustion chamber 50 with the burner 64, hydrogen generated by the splitting of $NH_3$ in the catalyst chamber 203 is completely burned due to the addition of air through line 51; furthermore, part of the $H_2S$ and of the elementary sulfur formed in the meantime are burned to $SO_2$. At this time, the gas has the composition shown under III in Table 3. The gas temperature is 1350 and the period of stay in the combustion chamber 50 is about 0.2 sec. The gas now leaves the chamber 50 through a short pipe 55 and enters a waste heat vessel 56 to which soft water is fed by line 57 and from which 0.8 tons of steam of 15 atmos. excess pressure are withdrawn per hour through line 58. The gas reaches the short pipe 59 with a temperature of 300° C., which is maintained constant by means of by-pass 61, regulating flap 62 and temperature control element 63. Through pipe 59, the gas is discharged from the plant in an amount of 2720 Nm.³ per hour, which are fed to a Claus oven in which 0.185 tons of pure sufur are hourly obtained, whereas a completely harmless waste gas is discharged into the atmosphere.

TABLE 3.—COMPOSITION OF GAS IN PERCENT BY VOLUME

| Number | Compound | Percent of— | | |
|---|---|---|---|---|
| | | I | II | III |
| 1 | $NH_3$ | 39.0 | 4.6 | |
| 2 | $N_2$ | | 45.5 | 54.4 |
| 3 | HCN | 2.0 | | |
| 4 | $H_2O$ | 30.0 | 36.3 | 34.6 |
| 5 | $CO_2$ | 15.0 | 7.0 | 5.9 |
| 6 | $H_2S$ | 14.0 | ¹ 6.6 | ¹ 3.4 |
| | $SO_2$ | | | ¹ 1.7 |
| 7 | Nm.³/hour | 950 | 2,025 | 2,720 |
| | °C | 70 | 1,150 | 1,350 |
| Period of stay in seconds | | | 0.2 | 0.2 |

¹ Depending on time of stay and temperature elementary sulfur may be present in vapor form.
Note.—The last three lines indicate quantities, temperatures and period of stay of gas treated.

Example III

Referring to FIG. 3 of the drawings, through conduit 45, burner 205 receives vapors whose characteristics are compiled under I in Table 3A. The unit is operated under 1.15 atmospheres (absolute). Through blower 47 and line 48, 990 Nm.³/hr. of air are admixed with the vapors and the mixture in burner 205 is partially burned into the combustion chamber 202. The characteristics of the partially burned gas are compiled in Table 3A under II. It is seen that the ammonia is already three-quarters decomposed, as well as the hydrogen cyanide except for traces, but the hydrogen sulfide is not yet burned to $SO_2$. The gas then enters the catalyst zone 203 filled with nickel catalyst on magnesite rings as carrier, in which the residual amounts of ammonia and hydrogen cyanide are decomposed. The decomposed gas then enters the exhaust zone 203a. The characteristics of the gas are compiled under III in Table 3A. Through line 49, combustion air is introduced in the exhaust zone 203a in another embodiment, but this is not made use of here. From the waste heat boiler 212, 400 kg./hr. of steam of 15 atmospheric pressure are drawn off. The characteristics of the gas cooled in the waste heat boiler 212 are compiled in Table 3A under IV. In the after-combustion chamber 50, 650 Nm.³/hr. of air are added to the gas for after combustion through blower 47 and the lines 48 and 51, as well as the connecting pipe which connects line 51 with combustion chamber 50. The after-burned gas leaving chamber 50 has the characteristics given under V in Table 3A. The hydrogen is now burned completely, and the hydrogen sulfide, to the extent that the $H_2S/SO_2$ ratio is 2. The gas flows through the connecting pipe 55 into the waste heat boiler 56, which receives soft water through line 57 and from which are taken 880 kg./hr. of steam of 15 atmos. through line 58. Cooled gas, suitable for use in a Claus furnace, leaves the waste heat boiler 56 through outlets 59. From the gas 0.185 t./h. of pure sulfur are produced, and a completely harmless exhaust gas is discharged into the atmosphere.

By means of the by-pass 52, the regulating valve 54 and the temperature control 53, the gas temperature before the combustion chamber 50 is maintained constant at 800° C., and also by means of by-pass 61, regulating valve 62 and temperature control 63, the temperature of the gas leaving the outlet 59 is maintained constant at 300° C.

The highest temperature occurring in the process according to the invention is 1350° C. If one adds the 650 Nm.³/hr. of air which are supplied to the combustion chamber 50 after the waste heat boiler 212, instead of together with the 990 Nm.³/hr. of air to the burner 205 through line 48 or to the exhaust zone 203a through line 49, one obtains in the combustion chamber 202 or respectively in the exhaust zone 203a a gas temperature of 1735° C. The exhaust zone 203a and the waste heat boiler must therefore be built entirely or partly of special, expensive refractory materials.

TABLE 3A

| Number | Substance—Quantity—Temperature | I | II | III | IV | V | VI |
|---|---|---|---|---|---|---|---|
| 1 | $NH_3$, volume percent | 39 | 4.6 | | | | |
| 2 | $N_2$, volume percent | | 45.5 | 45.6 | 45.6 | 54.4 | 54.4 |
| 3 | HCN, volume percent | 2 | | | | | |
| 4 | $H_2O$, volume percent | 30 | 36.3 | 34.8 | 34.8 | 34.6 | 34.6 |
| 5 | $CO_2$, volume percent | 15 | 7.0 | 6.7 | 6.7 | 5.9 | 5.9 |
| 6 | $H_2S$, volume percent | 14 | 6.6 | 6.4 | 6.4 | 3.4 | 3.4 |
| 7 | $SO_2$, volume percent | | | | | 1.7 | 1.7 |
| 8 | $H_2$, volume percent | | | 6.5 | 6.5 | | |
| 9 | Nm.³/hour | 950 | 2,025 | 2,117 | 2,117 | 2,700 | 2,700 |
| 10 | ° C | 70 | 1,150 | 1,100 | 800 | 1,350 | 300 |

What is claimed is:

1. In a two-stage process for the complete elimination of ammonia and hydrogen sulfide from coke oven gases, condensates of said gases, desorption gases or damp vapors resulting from stripping or distillation of wash liquids of said gases by combustion of ammonia so as to form nitrogen and water, and the combustion of hydrogen sulfide to form elementary sulfur, wherein air and fuel gases necessary to sustain and promote combustion of said gases are added in at least two stages, the improvement which comprises:
    (a) carrying out the combustion in a first stage at temperatures of about 1050° C. to about 1250° C. for about 0.2 to about 1.0 secs. wherein ammonia and hydrogen sulfide are partially burned in presence of air added in a first stage,
    (b) cooling the gases from the first combustion stage having a temperature not greater than 1350° C. in an indirect cooling means,
    (c) recovering superheated steam as by-product from said indirect cooling means,
    (d) carrying out at least another combustion at temperatures of about 1250° to about 1350° C. for about 0.2 to 1.0 secs. in at least a second stage of the cooled gases from the said indirect cooling means,
    (e) cooling the gases containing completely burned $NH_3$ and $H_2S$ produced in the further combustion stage (f) having a temperature not greater than 1350° C. and
    (f) recovering the cooled gases for further processing;

wherein the combustion and cooling steps are carried out in two stages, the amount of combustion air added in the first stage being sufficient to cause complete combustion of the fuel gases and to heat the mixture of gases to the decomposition temperature of $NH_3$ and HCN, also causing partial combustion of $H_2S$, and in the second stage the amount of combustion air added causing the generation of a gas mixture of $H_2S:SO_2=2:1$, said mixture being used for the recovery of elementary sulfur.

2. The process according to claim 1, wherein
    (a) damp vapors containing $NH_3$, $H_2S$ and HCN are at least partially fed directly to a reactor having (i) a combustion chamber, (ii) a catalyst chamber, and (iii) a discharge chamber, said reactor being provided with a burner in which a portion of the vapors enter and means for also introducing air and fuel gas therein,
    (b) the damp vapors are partially burned in the combustion chamber consuming substantially all fuel gas present,
    (c) the partially burned vapors are passed to the catalyst chamber wherein ammonia and HCN are decomposed to gaseous products,
    (d) the so-obtained gaseous decomposition products including $N_2$, $H_2$ and CO are passed to the discharge chamber, and thence to a first stage waste heat cooling vessel thereby partially cooling the gaseous products,
    (e) the partially cooled gases are passed to a second cooling vessel,
    (f) after cooling in said second cooling vessel, the cooled gaseous products are withdrawn, and passed to an after-burner wherein air is fed and the $H_2S$ contained in said gases is burned to yield an $H_2S:SO_2$ ratio of 2:1, and
    (g) the resultant gases are fed to a Claus oven in which elementary sulfur is separated and the remaining gases removed.

3. The process according to claim 2, wherein the catalyst chamber is filled with nickel catalyst.

4. The process according to claim 2, wherein the first stage cooling vessel is an indirect cooler, and the second stage cooling vessel is a direct cooler.

5. The process according to claim 4, wherein the cooling medium is soft water in both cooling vessels, in the first stage the indirect cooling taking place without direct contact between the gases and the cooling water, while the direct cooling in the second stage is taking place by direct contact between gases and cooling water.

6. The process according to claim 1, wherein
    (a) damp vapors containing $NH_3$, $H_2S$ and HCN are fed to a burner and thence to a reactor having (i) a combustion chamber, (ii) a catalyst chamber, and (iii) a discharge chamber, said reactor being provided with a burner in which the vapors enter and means for also introducing air and fuel gas therein, a portion of said vapors being admitted directly to the combustion chamber,
    (b) the damp vapors are partially burned in the combustion chamber, consuming substantially all fuel gas present,
    (c) the partially burned vapors are passed to the catalyst chamber wherein ammonia and HCN are decomposed to gaseous products,
    (d) the so-obtained gaseous decomposition products including $N_2$, $H_2$ and CO are passed to the discharge chamber, and thence to a first stage waste heat indirect cooling vessel to which soft water is admitted and steam withdrawn thereby partially cooling the gaseous products,
    (e) a portion of the partially cooled gases are passed to a second cooling vessel, cooled in said vessel and recirculated to the aforesaid reactor,
    (f) a portion of the partially cooled gases from the first stage cooling vessel are passed to an oven wherein sulfur is recovered from $H_2S$ and $SO_2$ and the gaseous products present are separated therefrom.

7. The process according to claim 6, wherein the catalyst chamber is filled with a nickel catalyst.

8. The process according to claim 7, wherein the first and second stage cooling vessels are both indirect coolers.

9. The process according to claim 1, wherein
   (a) damp vapors containing $NH_3$, $H_2S$ and HCN are fed to a first stage reactor having (i) a combustion chamber fitted with a burner wherein said vapors and air for combustion are admitted, partially burned and enter the combustion chamber where combustion is continued, (ii) a catalyst chamber, and (iii) a discharge chamber,
   (b) the damp vapors are partially burned in the combustion chamber,
   (c) the partially burned vapors are passed to the catalyst chamber wherein ammonia and HCN are decomposed to gaseous products,
   (d) the so-obtained gaseous products including $N_2$, $H_2$ and CO are passed to the discharge chamber, and thence to a first stage waste heat indirect cooling vessel to which soft water is admitted and steam withdrawn, thereby partially cooling the gaseous products,
   (e) the partially cooled gases are passed to a second stage reactor combustion chamber into which air is admitted and further combustion of the gases is carried out,
   (f) the gaseous products from the second stage reactor are passed to a second stage indirect waste heat cooling vessel to which soft water is admitted and steam withdrawn, and after cooling the gases therein,
   (g) said gases are passed to an oven where elemental sulfur is recovered and the gaseous products separated therefrom.

10. The process according to claim 9, wherein the catalyst chamber in the first stage reactor is filled with nickel catalyst.

11. The process according to claim 10, wherein the temperature of the gas entering the second stage reactor combustion chamber is held constant by means of a bypass conduit, temperature control and valve means, and the temperature of the gas discharged from the second stage indirect waste heat cooling vessel is held constant by means of a bypass conduit, temperature control and valve means.

References Cited
UNITED STATES PATENTS

| | | | |
|---|---|---|---|
| 3,505,027 | 4/1970 | Breitbach et al. | 423—351 |
| 3,292,345 | 12/1966 | Wunderlich et al. | 55—70 |
| 3,661,507 | 5/1972 | Breitbach et al. | 423—236 X |
| 3,540,189 | 11/1970 | Siewers et al. | 423—238 X |
| 3,000,693 | 9/1961 | Schulte | 423—237 |

FOREIGN PATENTS

| | | | |
|---|---|---|---|
| 1,000,772 | 8/1965 | Great Britain | 423—351 |
| 686,469 | 1/1953 | Great Britain | 423—573 |

OSCAR R. VERTIZ, Primary Examiner

B. E. HEARN, Assistant Examiner

U.S. Cl. X.R.

423—237, 242, 574